No. 890,453. PATENTED JUNE 9, 1908.
J. T. RICE & C. KING.
APPARATUS FOR ALINING CONDUIT SECTIONS.
APPLICATION FILED FEB. 23, 1907. RENEWED FEB. 11, 1908.
Fig. 1.
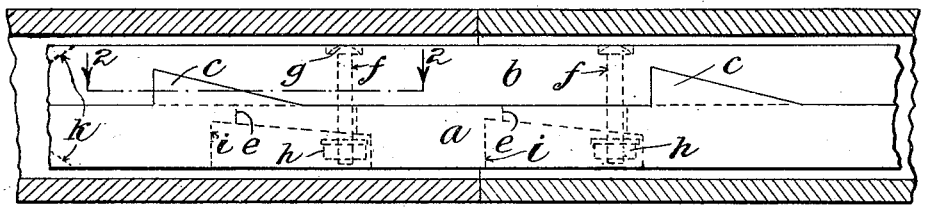
Fig. 2.
Fig. 3.
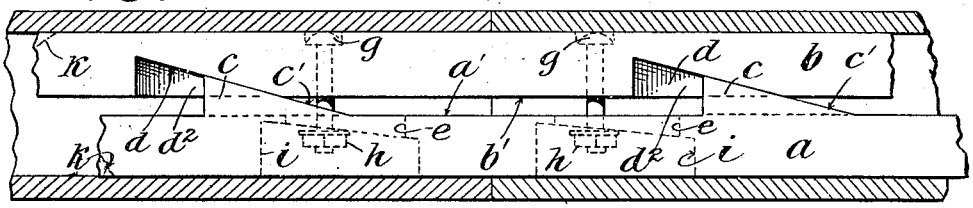
Fig. 4.
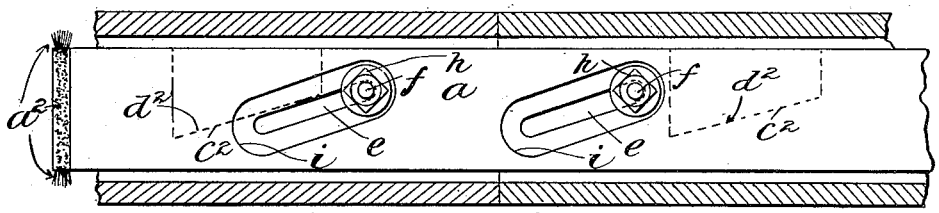
Fig. 5.
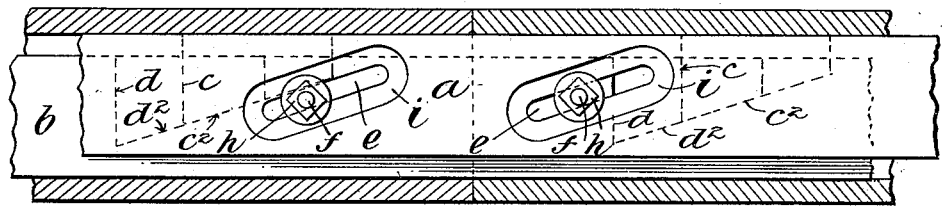
Fig. 6.
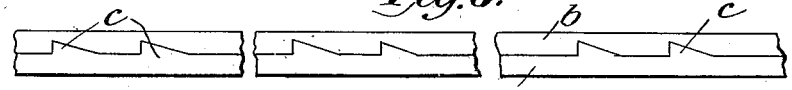
Attest:
Inventors:
Joseph T. Rice and
Coleman King,
by
Atty.

UNITED STATES PATENT OFFICE.

JOSEPH T. RICE AND COLEMAN KING, OF WEST HOBOKEN, NEW JERSEY, ASSIGNORS TO THE FIRM OF KING, RICE AND GANEY, OF WEEHAWKEN, NEW JERSEY.

APPARATUS FOR ALINING CONDUIT-SECTIONS.

No. 890,453.      Specification of Letters Patent.      Patented June 9, 1908.

Application filed February 23, 1907, Serial No. 359,019. Renewed February 11, 1908. Serial No. 415,369.

*To all whom it may concern:*

Be it known that we, JOSEPH T. RICE and COLEMAN KING, citizens of the United States, residing at West Hoboken, in the county of Bergen and State of New Jersey, have invented a new and useful Improvement in Apparatus for Alining Conduit-Sections, of which the following is a specification.

This invention relates to devices for alining conduit sections when laying the latter underground to contain electric wires or to serve as ducts generally, and the object of our improvement is to provide an appliance which can be conveniently passed through adjacent conduit sections, and, at their juncture expanded to true and aline such sections relatively to each other both as regards their side walls and tops and bottoms.

In the drawing accompanying this application, Figure 1 is a side sectional elevation of our appliance, broken away, inserted within conduit sections, the two parts of the appliance being closed together. Fig. 2 is a partial horizontal section of the same. Fig. 3 is a view corresponding to Fig. 1, but showing the two parts of our appliance extended within the conduit sections. Fig. 4 is a horizontal section through adjacent conduit sections, showing our appliance in bottom plan view, as contracted therein. Fig. 5 is a corresponding view to that of Fig. 4, but with the two parts of our appliance extended, and Fig. 6 is a broken away side elevation of our apparatus.

In carrying out our invention, we provide two longitudinal strips which placed one against the other have a substantially rectangular unified cross sectional area, but which by aid of certain interacting formations enable said strips, when shifted oppositely upon each other, to spread said sections apart both laterally and vertically while maintaining their parallel relation. Said longitudinal strips are indicated respectively by the letters $a, b$ and are placed one upon the other, having the meeting surfaces $a' b'$. The member $a$ is provided with two or more inclined ride-ways, as $c$, which, when the strips $a, b$ are placed together are seated within inclined recesses $d$, the inclined surfaces $c'$ of ride-ways $c$ lying against the inclined surfaces of recesses $d$. The ride-ways $c$ and the recesses $d$ are placed towards one side of their respective strips $a, b$, extending only part-way across the transverse areas of said strips. The ride-ways $c$ have perpendicular walls $c^2$, which form inclines tapering towards their narrow ends, and said inclines seat against corresponding inclines $d^2$ which form inner boundaries of the recesses $d$. Hence movement longitudinally of the strips $a, b$ in opposite directions causes their unified structure to expand both laterally and vertically. The strip $a$ is provided with vertical slots $e$ arranged at an inclination corresponding to that of the inclined surfaces $c^2, d^2$; and bolts or studs $f$ projecting from the face of strip $b$, are slidably entered within said slots, thereby forming guides for said strips in the expanding movement aforesaid. The bolt heads $g$ are countersunk within the outer surface of strip $b$ and the opposite heads or nuts $h$ are accommodated within countersunk enlargements $i$ of the slots $e$, so that said heads or nuts do not extend above the outer surface of strip $a$. Sufficient slack or play is left between the heads or nuts $h$ and the outer surface of slots $e$ to permit the vertical ride of strips $a, b$ one upon the other, but limiting their degree of separation.

The edges $j$ of strips $a, b$ may be beveled, and their forward ends may be sufficiently tapered as at $k$ to enable the unified structure to be entered within conduit sections. The said strips being of sufficient length are extended through a number of conduit sections, which are as it were strung thereon. One of said strips is then moved longitudinally upon the other strip, in that action said strips expanding both vertically and laterally as described thereby truing or alining the sections in position for effecting proper joints between them, whereafter the device is again contracted by reversing the longitudinal movement or its strips, and is withdrawn from its position, to be inserted within other succeeding sections.

One of the strips, as $a$, may have a brush, as $a^2$, extended from its forward end, to clear the sections of fragments of cement and the like.

We claim:—

An improved device for alining conduit sections comprising two approximately rectangular strips provided respectively with inclined ride-ways and recesses which coact in the movement of said strips in opposite directions to expand the latter both vertically and laterally, together with means for limiting their degree of separation.

JOSEPH T. RICE.
COLEMAN KING.

In presence of—
  FREDERICK C. BONNY,
  M. A. WESTERVELT.